United States Patent [19]

Calvino

[11] 4,379,957
[45] Apr. 12, 1983

[54] MODULAR "Y"-TYPE ENCLOSURE ELEMENTS FOR GAS INSULATED SUBSTATIONS

[75] Inventor: Ben J. Calvino, Monroeville, Pa.

[73] Assignee: Westinghouse Electric Corp., Pittsburgh, Pa.

[21] Appl. No.: 224,872

[22] Filed: Jan. 14, 1981

[51] Int. Cl.³ ............................................. H01N 33/14
[52] U.S. Cl. ................................ 200/145; 200/148 D; 200/148 R
[58] Field of Search ................ 200/148 D, 148 R, 145

[56] References Cited

U.S. PATENT DOCUMENTS

| | | | |
|---|---|---|---|
| 2,748,226 | 5/1956 | MacNeill et al. | 200/148 D |
| 3,167,630 | 1/1965 | Alderman et al. | 200/148 D |
| 4,215,256 | 7/1980 | Sakaguchi et al. | 200/148 R |
| 4,223,191 | 9/1980 | Calvino | 200/145 |
| 4,293,747 | 10/1981 | Perulfi | 200/148 R |

FOREIGN PATENT DOCUMENTS

| | | | |
|---|---|---|---|
| 1390848 | 1/1965 | France | 200/148 D |
| 916916 | 1/1963 | United Kingdom | 200/148 D |
| 753375 | 7/1956 | United Kingdom | 200/145 |

*Primary Examiner*—Robert S. Macon
*Attorney, Agent, or Firm*—M. J. Moran

[57] ABSTRACT

A modular "Y"-type enclosure element particularly adapted for gas insulated substations. The enclosure element comprises a first generally "Y"-shaped enclosure element having a circuit protective device, such as a circuit breaker or conductor, disposed therein for controlling the flow of current through the enclosure element. A flanged opening is attached to each leg of the enclosure element for electrical and mechanical attachment to another enclosure element. A second generally "Y"-shaped enclosure having a circuit control device, such as a ground switch, disposed within the enclosure element also for controlling the flow of current through said enclosure element. A flanged opening is again attached to each leg of said second enclosure element for electrical and mechanical attachment to first said enclosure element.

11 Claims, 2 Drawing Figures

MODULAR "Y"-TYPE ENCLOSURE ELEMENTS FOR GAS INSULATED SUBSTATIONS

BACKGROUND OF THE INVENTION

1. Field of the Invention

This invention relates to gas insulated substation equipment and more particularly to "Y"-shaped enclosure elements providing a modular approach to gas insulated substation manufacturing and usage.

2. Description of the Prior Art

In recent years, there has come about a demand for a reduced-size substation. This demand on the part of public utilities has been met by gas insulated substation equipment. This type of substation equipment significantly reduces the space required by the high voltage value of substations rated for example, 46 KV through 500 KV. Space reduction is accomplished by replacing the open-bus and the air-tight bushings with a gas insulated bus filled, for example, with a highly insulating gas such as sulphur hexafluoride gas at a pressure, for example, of 45 pounds per square inch gauge and thereby permitting the movement of electrical equipment very closely together.

This gas insulated substation equipment has many advantages, among which are: significant reduction in size requirements both in land area and overall height; added system reliability by eliminating the possibility of phase-to-phase faults, lightening strikes within the system, or contamination of insulators; reduced maintenance because the closed system is isolated from the environment; added personnel safety because all live parts are covered by ground shields; and lower installation costs as compared with conventional or other types of power systems when the gas insulated compartment approach is utilized.

The gas insulating system, as briefly described above, has additional design advantages, inasmuch as the high voltage equipment is compressed, so that both the space required and the total length is minimized. The power transformers may be located on outside corners so as to be capable of ready removal, and the location of cable pot heads is flexible, with results that the system may be readily connected to overhead transmission lines.

However, the costs of manufacturing such gas insulated components are very expensive. Additionally when circuit control device mechanisms such as circuit breakers, ground switches and disconnect switches are utilized, each piece of equipment requires individualistic enclosure elements. This therefore reduces the mass production potential thereby keeping manufacturing costs higher than is desirable.

The use of singular "Y"-type gas insulated substation equipment is taught in various patents. In U.S. Pat. No. 4,223,191 "Upstanding Mounting Structure For High-Voltage Three-Break Live-Module Circuit-Breaker" issued Sept. 16, 1980 to Calvino assigned to the assignee of the present invention, there is illustrated a "V"-shaped supporting structure with an interconnecting support structure thereby looking like an inverted "A"-structure. Additional "Y"-type structures are taught in U.S. Pat. No. 4,131,775 "Compressed-Gas Circuit-Interrupters Of The Puffer-Type Having Improved Supporting, Shielding And Assembly Features", issued Dec. 26, 1978 to Meyer et al.; U.S. Pat. No. 3,935,408 "Heating Means For High-Voltage Gas-Type Circuit Interrupter" issued Jan. 27, 1976 to Taylor, U.S. Pat. No. 3,846,601 "Compressed-Gas Circuit Interrupter" issued Nov. 5, 1974 to Leeds; U.S. Pat. No. 3,662,128 "Readily Transportable Circuit Breaker Of Two-Piece Segmented Frame Construction And Two-Positioned Operating Mechanism Housing" issued May 9, 1972 to Neudorfer et al.; all assigned to the assignee of the present invention. Additionally, U.S. Pat. No. 4,019,007 "Grounded-Tank High-Power Compressed-Gas Circuit-Interrupter" issued Apr. 19, 1977 to Friedrich et al. and assigned to the assignee of the present invention teaches a modified "H"-type circuit protection structure.

The above patents while teaching various methods of modular construction, still require a specific structure for a specific circuit control device. Therefore a circuit breaker mechanism would have a structure which was designed for the circuit breaker mechanism alone and therefore a ground switch mechanism, as an example, would not be properly suited. Additionally, the above structures are not modular to the extent that they are not serially connectable with identical elements. They therefore do not allow differing control devices to be serially connected, such as a circuit breaker, a disconnect switch, and a ground switch or any combination thereof without requiring separate and distinct structures for each mechanism.

There was a limited disclosure of the subject matter of the present application on or about Dec. 5, 1977 to the U.S. Department of Energy in an oral and related presentation by the assignee of the present invention, proposal No. PCB 92077 which was in response to the U.S. Department of Energy Request for Proposal No. EC-77-R-01-5065.

It would be advantageous to provide a means which is adaptable for use with either of the circuit protective devices mentioned above or a combination thereof. It would also be desirable to provide for modular growth, expansion or design as the particular application requires. It is also advantageous to provide a means which is less complex and less expensive to produce.

SUMMARY OF THE INVENTION

Briefly stated, the modular "Y"-type enclosure elements of this invention comprise a sealed chamber for containing an insulating gas and having a "Y"-shape for containing circuit protective and current carrying devices. The enclosure element may be multipled, connecting as many enclosure elements together as is desirable. The enclosure elements may have circuit control devices disposed therein which may include disconnect switches, ground switches or circuit breaker mechanisms. Additionally the enclosure element may contain only connecting bars for conducting current therethrough. When circuit protective devices are utilized an actuating mechanism may be centrally disposed within the "Y"-shape enclosure for operating the particular device. The legs of the enclosure elements have flanged openings for electrically and mechanically attaching enclosure elements to each other. Additionally an end cap mechanism may be attached to one of the flanged openings of the enclosure element for facilitating the operation of the actuating mechanism.

BRIEF DESCRIPTION OF THE DRAWINGS

Reference is now made to the description of the preferred embodiment, illustrated in the accompanying drawings in which.

DESCRIPTION OF THE PREFERRED EMBODIMENT

Throughout this description, like components will be identified by like numerals. Modified components similar in structure to previously described components will be identified by the previously assigned numerals with the addition of a prime (').

Figure 1:
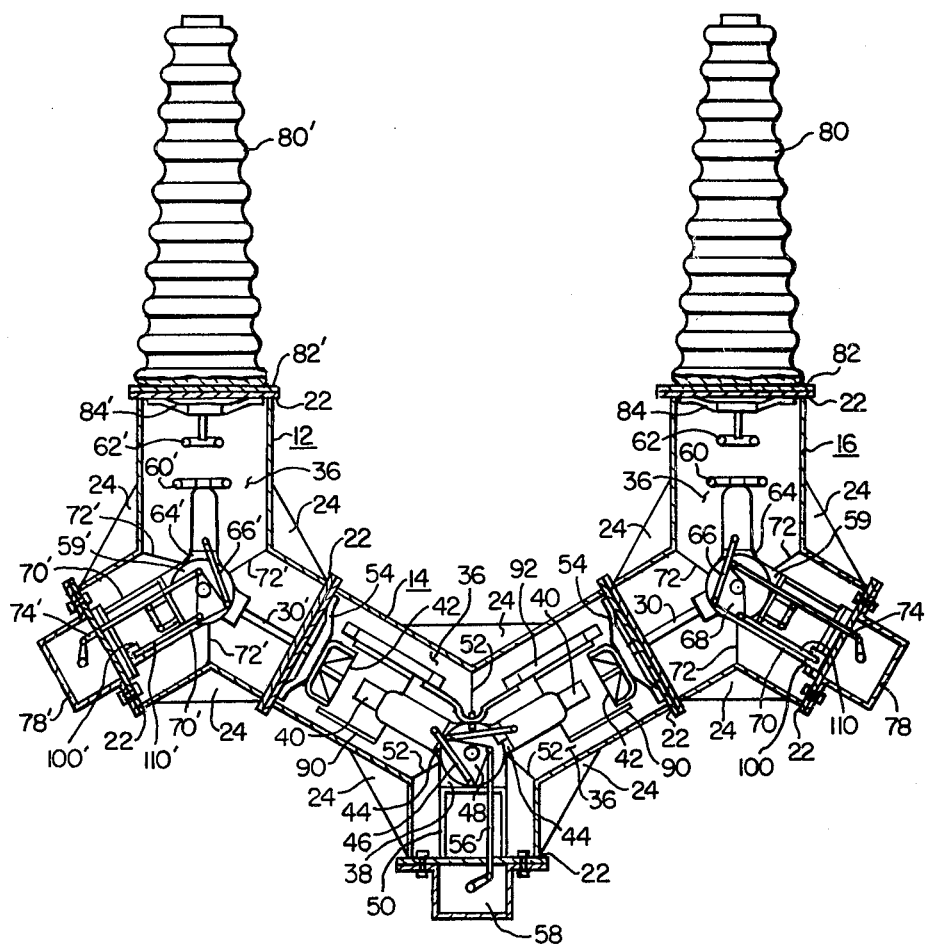
FIG. 1 is a longitudinal, side, sectional view taken through the enclosure apparatus, illustrating a circuit breaker and two ground switches provisions for connection to aerial lines.

Referring now to the drawings and in particular to FIG. 1, three "Y"-shaped enclosure elements 12, 14, and 16, are serially connected. The enclosure elements 12, 14 and 16, each have three legs. The angle between each of the legs is designed so as to facilitate proper equipment spacing. At the end of each leg are flanges which are for electrically and mechanically attaching adjacent enclosure elements as well as such apparatus as a gas insulated substation may require, for example, an insulator for transition from a gas insulated substation to aerial transmission. Support members 24 extend between any two adjacent legs and are rigidly attached near the flanges 22 providing structural strength therefore.

Disposed within the interconnected distribution system is an electrically insulating gas 36 such as sulphur hexafluoride which is pressurized in the distribution system at a suitable pressure, such as 45 PSI gauge.

Disposed within enclosure element 14 is a double break circuit breaker mechanism 38. The mechanism for the circuit breaker 38 may be of the type taught in U.S. Pat. No. 4,205,208 "Double-Flow Compressed-Gas Operating Mechanism For A High-Voltage Circuit-Breaker" issued May 27, 1980 to Calvino and is assigned to the assignee of the present invention. To those who are skilled in the art, the mechanism taught by Calvino can be readily adapted to the present invention and therefore only a brief description is provided below. However, it is to be understood that other circuit breakers utilizing different operating mechanisms may be adapted to operate within the enclosure element 14. The circuit breaker mechanism 38 shown in the open position, comprise movable contacts 40 which make and break contact with the stationary contacts 42, thereby permitting or prohibiting the flow of current therethrough. The movable contacts 40 are directed in their movement and held in place by a movable contact sleeve 44. Pivotally mounted to the movable contacts 40 are movable contact linkages 46 which are connected at one end to the movable contacts 40, and pivotally mounted at the other end to a rotatable movable contact disc 48. The rotatable movable contact disc 48 is pivotally mounted to the housing of the circuit breaker mechanism 38. The circuit breaker mechanism 38 is rigidly attached to the circuit breaker mounting frame 50 which is rigidly attached to the flange 22 of enclosure element 14. The circuit breaker mechanism 38 may additionally be constrained in its position by circuit breaker mounting brackets 52, which are attached at one end to the circuit breaker mechanism 38 and at the other end to the inside wall of the enclosure element 14. The stationary contacts 42 are positioned by the circuit breaker insulating support members 54, which support as well as insulate the stationary contacts 42. A circuit breaker control linkage 56 is attached at one end to the rotatable movable contact disc 48 and at the other end to an end cap mechanism 58. The end cap mechanism 58 contains suitable circuit breaker control equipment and an electric motor or a hydraulic system so as to sense an overload condition thereby separating the movable contacts 40 from the stationary contacts 42. An insulating partition 90 surrounds the contacts of the circuit breaker mechanism 38 and is for containing hot gas, generated during the opening of the contacts, from creating a ground fault condition. The insulating partition 90 is attached to an insulating partition bracket 92 which is attached to the housing of the circuit breaker mechanism 38.

Referring now to the ground switch of FIG. 1, there is shown two ground switches 59, 59' in the open position. The ground switch movable contact 60, 60' and the ground switch stationary contact 62, 62' make and break contact with the operation of the ground switch 59, 59' thereby permitting or prohibiting the flow of electrical current therethrough. The ground switch movable contact 60, 60' is guided by the ground switch movable contact sleeve 64, 64'. A movable ground switch contact linkage 66, 66' is pivotally attached at one end to the ground switch movable contact 60, 60' and pivotally attached at the other end to a ground switch rotatable disc 68, 68'. The rotatable ground switch disc 68, 68' is rotatably attached to the housing of the switch 59, 59'. The ground switch is rigidly attached to the ground switch mounting frame 70, 70' which is rigidly attached to the flange 22 of enclosure elements 12 and 16. A ground switch control linkage 74, 74' is pivotally attached at one end to the rotatable ground switch disc 68, 68' and at the other end to the ground switch end cap mechanism 78, 78'. Ground switch mounting brackets 72, 72' may be rigidly attached at one end to the housing of the ground switch 59 and at the other end to the inside walls of enclosure elements 12 and 16. The connecting bar 30, 30' which extends into the enclosure elements 12 and 16 rigidly attaches both mechanically and electrically the ground switches 59, 59' to the circuit breaker stationary contacts 42, 42'. The ground switch end cap mechanism 78, 78' controls the operation of the switch 59, 59'. Therefore upon the actuation of the ground switch end cap mechanism 78, 78' the ground switch control linkage 74, 74' causes the rotation of the ground switch rotatable disc 68, 68' thereby causing the ground switch movable contact 60, 60' to make or break contact with the ground switch stationary contact 62, 62' thereby, respectively, permitting or prohibiting the flow of electrical current therethrough.

A stationary ground contact 100, 100' which makes and breaks contact with a sliding ground contact 102, 102'. A sliding ground contact linkage 110, 110' is pivotally attached at one end to the sliding ground contact 102, 102' and pivotally attached at the other end to the ground switch rotatable disc 68, 68'. The sliding ground contact 102, 102' moves along the ground switch mounting frame 70, 70' maintaining electrical contact with the ground switch mounting frame 70, 70'. Upon the opening and grounding operation of the ground switch 59, 59', 62, 62' hereby interrupting the flow of current therethrough. Additionally the sliding ground contact linkage 110, 110' is urged downwards until it is in electrical contact with the stationary ground contact 100, 100'. Stationary ground contact 100, 100' is mechanically and electrically attached to the ground switch 59, 59', and thereby to electrical ground through the outer shell of the enclosure elements 12, 16.

Attached to the enclosure elements 12, 16 are aerial insulators 80' and 80 respectively. The aerial insulators 80, 80' are for transition from a gas insulated system to the aerial transmission of electrical current. The aerial insulators 80, 80' are rigidly attached to aerial insulator mounting brackets 82' and 82 which are in turn attached to the flanges 22 of enclosure elements 12, and 16. An electrical conductor contained in each aerial insulator 80, 80' is electrically and mechanically attached to the ground switch stationary contacts 62, 62'.

Figure 2:
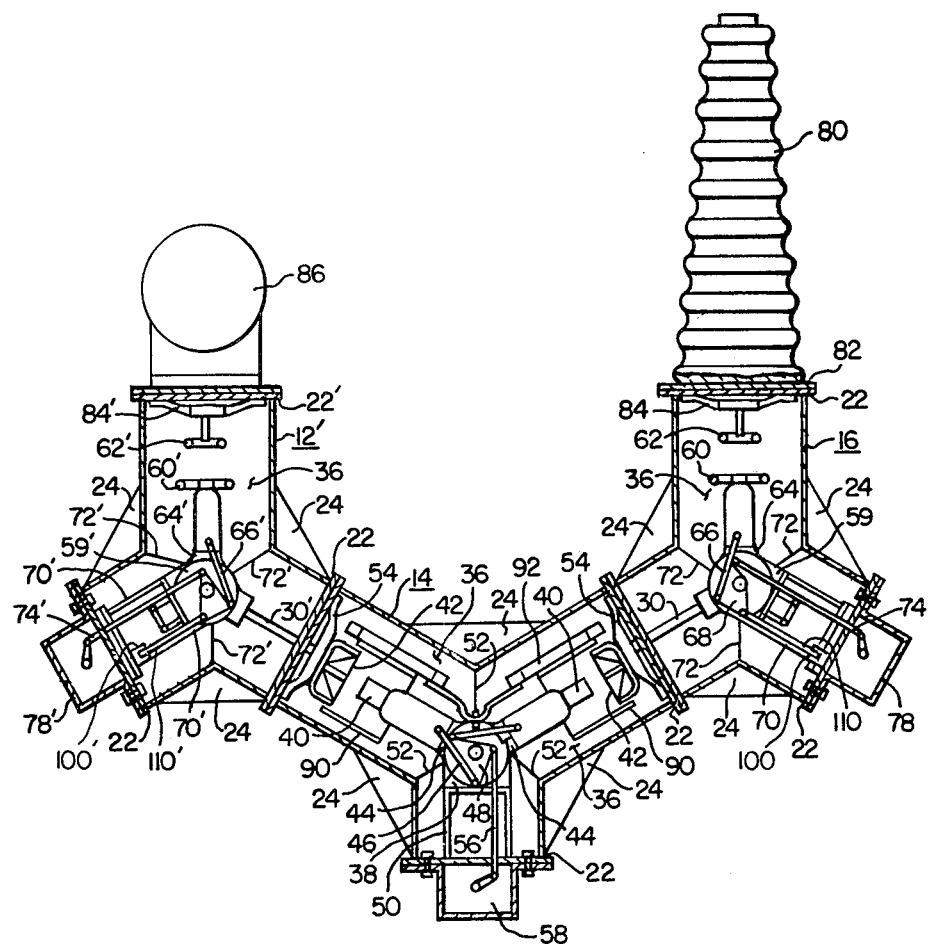
FIG. 2 is a longitudinal, side, sectional view taken through the enclosure apparatus, illustrating two ground switches, a circuit breaker and provisions for connection to an aerial line and bus bar conduit.

Referring now to FIG. 2, there is shown a gas insulated substation equipment installation having a circuit breaker, ground switches, and enclosure elements identical to that shown in FIG. 1. Also shown is an aerial insulator 80 identical to that shown in FIG. 1. Additionally, rigidly attached to enclosure element 12' is gas insulated bus conduit 86 which is for transition to a gas insulated bus way system.

It is to be understood that different mechanisms may be placed inside the enclosure elements, such as surge suppressors, as well as different types of circuit breakers, disconnect switches, ground switches and connecting bars.

Thus the disclosed invention provides a generally "Y"-shaped enclosure element which may be serially connected to form part of a gas insulated substation which is highly modular in nature thereby allowing different mechanisms to be placed inside enclosure elements permitting a wide variety of uses. The present invention therefore provides a less complex and less expensive way of interconnecting apparatus in a gas insulated substation environment.

What I claim is:

1. A compressed gas modular circuit control system, comprising:

a first generally "Y"-shaped enclosure element having a circuit control means disposed therein for controlling the flow of current therethrough and a flanged opening means attached to a leg of said enclosure element for electrically and mechanically connecting said enclosure element to another enclosure element; and a second generally "Y"-shaped enclosure element having a circuit breaker control means disposed therein for controlling the flow of current therethrough and a flanged opening means attached to a leg of said second enclosure element for electrically and mechanically attaching said second enclosure element to first said enclosure element.

2. A device according to claim 1 wherein a support member means is rigidly attached between said leg of said "Y"-shaped enclosure element for providing structural strength therein.

3. A device according to claim 1 wherein said generally "Y"-shaped enclosure element contains a circuit breaker mechanism.

4. A device according to claim 1 wherein said generally "Y"-shaped enclosure element contains a disconnect switch mechanism.

5. A device according to claim 1 wherein said generally "Y"-shaped enclosure element contains a ground switch mechanism.

6. A device according to claim 1 wherein said circuit control device means is centrally located in said "Y"-shaped enclosure element.

7. A device according to claim 1 wherein said "Y"-shaped enclosure element is cylindrical.

8. A device according to claim 1 wherein an actuating mechanism means is centrally disposed within said "Y"-shaped enclosure element for controlling the operation of said circuit control devices.

9. A device according to claim 8 wherein an end cap mechanism means is attached to a flanged opening of said "Y"-shaped enclosure element for controlling said actuating mechanism.

10. A device according to claim 1 wherein insulating means are sealingly placed in said enclosure elements for electrically isolating and supporting said circuit control device means.

11. A device according to claim 1 wherein there is a third generally "Y"-shaped enclosure element having connecting bar elements disposed therein is attached to said second enclosure element for permitting the flow of electric current therethrough.

* * * * *